United States Patent
Jeske

(10) Patent No.: US 9,160,263 B2
(45) Date of Patent: Oct. 13, 2015

(54) SYSTEM AND METHOD FOR MONITORING AND CONTROLLING A BRUSHLESS ELECTRIC MOTOR

(75) Inventor: Edson Jeske, Joinville (BR)

(73) Assignee: Whirlpool S.A., Sao Paulo (BR)

( * ) Notice: Subject to any disclaimer, the term of this patent is extended or adjusted under 35 U.S.C. 154(b) by 268 days.

(21) Appl. No.: 13/876,119

(22) PCT Filed: Sep. 27, 2011

(86) PCT No.: PCT/BR2011/000347
§ 371 (c)(1),
(2), (4) Date: Jun. 14, 2013

(87) PCT Pub. No.: WO2012/040805
PCT Pub. Date: Apr. 5, 2012

(65) Prior Publication Data
US 2013/0300329 A1  Nov. 14, 2013

(30) Foreign Application Priority Data
Sep. 27, 2010 (BR) ....................................... 1003901

(51) Int. Cl.
H02P 1/46 (2006.01)
H02P 6/18 (2006.01)

(52) U.S. Cl.
CPC .................................... *H02P 6/182* (2013.01)

(58) Field of Classification Search
CPC ..... H02P 25/08; H02P 23/0036; H02P 23/04; H02P 6/182; H02P 6/14; H02P 6/11
USPC ................... 318/701, 400.01, 400.23, 400.34
See application file for complete search history.

(56) References Cited

U.S. PATENT DOCUMENTS 5,019,756 A 5/1991 Schwarz
7,196,484 B1 3/2007 Chui et al.
(Continued)

FOREIGN PATENT DOCUMENTS

JP 55-005035 1/1980

OTHER PUBLICATIONS

International Search Report mailed Aug. 21, 2012 for International application No. PCT/BR2011/000347.
(Continued)

*Primary Examiner* — Karen Masih
(74) *Attorney, Agent, or Firm* — Fay Sharpe LLP

(57) ABSTRACT

A system for monitoring and controlling a brushless motor associable to an electric power source by means of a rectifier. An actuator assembly is operatively associated to the motor and rectifier. The rectifier is arranged to provide a continuous busbar voltage (Vbar) and a continuous reference voltage (Vref) to the actuator assembly. The actuator assembly includes switches ($SW_{1-6}$) arranged to energize two phases of the motor simultaneously. The system comprises a voltage observer, associated to the motor and to the actuator assembly, permitting monitoring of an induced voltage in a non-energized phase of the motor. The system includes a control unit associated to the voltage observer. The control unit is arranged to command opening of a switch of the actuator assembly for a time interval to interrupt the power supply to the motor, when the reading of the induced voltage in the non-energized phase presents a value within a voltage interval (dV). A method of identifying transient currents in a coil of a non-energized phase of a brushless motor, for the extinction, is provided.

27 Claims, 7 Drawing Sheets

(56) References Cited

U.S. PATENT DOCUMENTS

Figure 1:
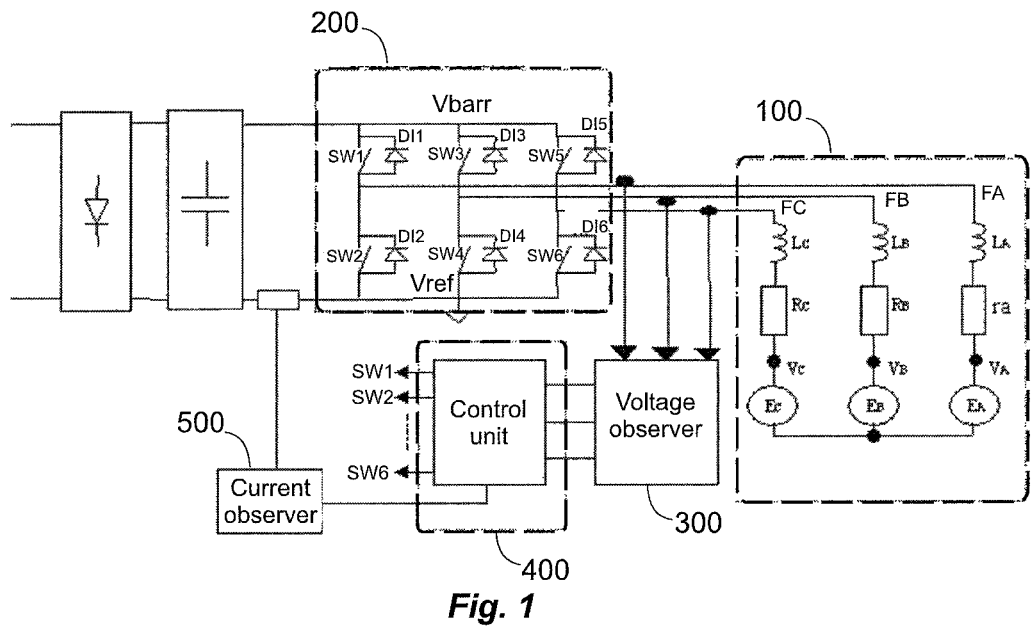

| | | | |
|---|---|---|---|
| 8,796,968 B2 * | 8/2014 | Soares et al. | 318/400.23 |
| 2004/0263109 A1 | 12/2004 | Schwarz | |
| 2006/0152181 A1 | 7/2006 | Shao et al. | |

OTHER PUBLICATIONS

Written Opinion mailed Aug. 21, 2012 for International application No. PCT/BR2011/000347.

* cited by examiner

SYSTEM AND METHOD FOR MONITORING AND CONTROLLING A BRUSHLESS ELECTRIC MOTOR

The present invention refers to a monitoring and control system, capable of preventing the formation of undesirable transient overcurrents in a brushless electric motor, in order to optimize its operating efficiency when it is subject to loads that present a relatively high torque transient.

The present invention also refers to a method for monitoring and controlling a brushless electric motor, which provides for avoiding the demagnetization of motor magnets and also for preventing damage to its internal components when undesirable internal transient currents occur in said motor.

DESCRIPTION OF THE STATE OF THE ART

Today, permanent magnet electric motors of the brushless kind (Brushless DC or BLDC) are evermore used in applications requiring robustness of operation coupled with high efficiency and low cost. The working principle of a BLDC motor is similar to that of a conventional continuous current motor (DC) with brushes, however, in the BLDC the magnets are mounted on the motor rotor, and, in stator, there is installed a set of coils responsible for producing a rotating field capable of providing rotational movement to the motor. Additionally, differently to the conventional DC motor where the coils are added sequentially by a switching system with brushes, in the BLDC motor the coils are driven by an electronic system and have to be synchronized according to the rotor position in relation to the stator.

In this sense, so that a BLDC motor can be controlled by an electronic system, the rotor position should be known in order to permit the determination of the switching of the motor coils. Said rotor position can be obtained with the use of sensors coupled to the motor, such as, for example, HALL-effect sensors and suitable encoders that provide a precise control of the motor, but present a high cost. In certain applications such as, for example, in compressors for cooling, the cost, construction and reliability factors make the use of such sensors practically unfeasible.

In contrast, a widely known technique used for controlling BLDC motors consists of using the information from the motor coils themselves to estimate the rotor position in relation to the stator. Such technique is known as sensorless control, since it does not use any kind of sensing device specifically designed for this purpose. In general terms, this technique is based on the premise that a three-phase motor with simultaneous drive of only two coils, there will be a variation of magnetic flow capable of inducing a voltage in the non-energized phase of the motor, by virtue of its rotating movement. The amplitude of this voltage, in turn, is directly related to the rotor position in relation to the stator, and, therefore, it can be used to estimate a switching instant for the next position of the motor.

There are already certain known techniques for treating induced voltages in sensorless control so as to permit the sensoring of the position, in order to enable the control of the motor.

For example, North American patent application US 2004/0263109 describes a control strategy considering the induced voltages in a BLDC motor, but it only works with the motor in movement, that is, when the motor already has sufficient rotating speed, where the induced voltages have a minimum amplitude to enable the use of the technique. If the motor is in another operating condition, it is necessary to use other techniques capable of providing movement thereof, until it is possible to detect the induced voltages.

The Japanese patent document JP 55005035 describes a technique for starting up BLDC motors with sensorless control. Said technique consists of applying a current to the motor coils in a certain sequence, gradually increasing the switching frequency between the positions of the motor, until the motor reaches a sufficient speed so that the induced voltages can be monitored. As of this point, the motor enters self-controlled mode, where the switching thereafter occur based on the induced voltages. A drawback of this method is that during the start-up procedure there may be a loss of synchronism, as the induced voltages are not monitored. This loss of synchronism may generate high transient currents, which may cause demagnetization of the motor. Another drawback is that this technique is very sensitive to load variations, easily losing synchronism when operated under different starting torque conditions.

North American patent U.S. Pat. No. 5,019,756 describes a technique having four different stages for driving a BLDC motor, until it is working in the auto-pilot mode, wherein the speed control is made according to the induced voltages of the motor. In the first step, a current is applied to an motor coil arrangement, starting at zero up to a maximum value, and this procedure aligns the motor rotor in a position now known by the control system. In the second step, the current is transferred to a second motor coil arrangement, so as to generate acceleration in the motor rotor in a desired direction. This current is maintained in the second coil for a specific time, and once this time has expired, again a switch occurs to a third coil arrangement, beginning the third step of the start-up strategy. As of this point, the motor already attains sufficient speed, and, the control thereafter monitors the induced voltages of the motor. If during a predefined time interval during the third step, the control detects a valid position of the motor, switching occurs and the motor enters the fourth step, which is characterized by operating based on the induced voltages of the motor. If a valid position is not detected, the start-up procedure is restarted at the first step. However, this method, when applied to loads that require high starting torque, may not present good results. Said loads consist, for example, of compressors for cooling, which require start-up under conditions of unequalized suction and discharge pressures (High Starting Torque). Under these conditions, which may occur during the start-up transient period, the motor drive is made out of synchronism with the induced voltages, which causes the formation of internal transient currents in the motor, and may demagnetize the magnets or even damage the drive circuit. In other words, in the unbalanced pressure condition, a high torque is required of the motor until the compressor manages to overcome the initial transient pressure.

The torque produced in a BLDC motor is proportional to the current applied thereon, and also to the magnetic flow generated by the permanent magnets. Based on this concept, if maximum torque is desired during a motor start-up procedure, it is suffice to increase the current applied thereon to maximum value, considering that this current is applied in synchronism with the induced voltages of the motor. However, this technique may cause the appearance of internal transient currents in the motor, which cannot be measured directly by known techniques, since only the current of the rectifier bus is gauged. As already mentioned previously, transient currents may arise in the case of extreme load on the motor axle, being caused by differences between the position sensoring and the motor drive. Said differences derive from the fact that the induced voltages are very low to permit an identification of the exact switching instant.

In particular, during the start-up procedure of a BLDC motor, situations may occur where a high starting torque is necessary, such that the motor manages to acquire a certain speed and begins operating based on position sensing determined by the induced voltages in its coils. The gas compressors for application in cooling, when used in systems that have block or expansion valves, which require a relatively high starting torque, are susceptible to major torque transients during start-up procedure. In such situations, by virtue of the low rotation of the motor, the position sensing of the motor is adversely affected, making the control of the motor critical in these conditions. In other words, owing to the difference between the real position of the motor and the voltage applied to the motor, transient currents may appear inside the motor, which may attain magnitude values capable of causing damage to the internal magnetic components of the motor. In the same way, the appearance of transient currents may also occur under normal operating/working regime of the motor, due to the extreme load required by the application and also due to the instantaneous and sudden variations in torque. These transient currents may also influence the size of the power semiconductors, since they must be designed to meet the current levels required by the application, causing an increase in the end cost of the solution.

Therefore, a system/method of monitoring and controlling a low cost BLDC motor having the capacity to avoid the formation of internal transient currents in the start-up situation and regime allied with the robustness to load variations is not yet known.

OBJECTIVES OF THE INVENTION

Therefore, it is a first objective of this invention to provide a low cost system/method to monitor and control the operation of a brushless electric motor (BLDC—Brushless DC), which presents the capacity of preventing the formation of internal transient currents in the motor, and, which is also robust against potential load variations that may occur in the system.

It is also a second objective of this invention to provide a system/method that is immune to potential load variations that may occur, that is capable of providing for the monitoring and control of the operation of a brushless electric motor (BLDC—Brushless DC) so as to optimize its operating efficiency, when it is subject to loads presenting relatively high transient torque.

It is also a third objective of this invention to provide a low cost system/method, that provides for the monitoring and control of a brushless electric motor (BLDC—Brushless DC), capable of avoiding demagnetization of motor magnets and also of preventing damage to its internal components when undesirable internal transient currents in said motor occur, improving the operating characteristics both in the regime condition as in the motor start-up, when it is subject to loads with high transient torque.

It is also a fourth objective of this invention to provide a system/method capable of permitting indirect sensing of internal transient currents of a brushless electric motor (BLDC—Brushless DC), as well as an algorithm to extinguish these currents.

BRIEF DESCRIPTION OF THE INVENTION

One or more objectives of the invention is(are) achieved by providing a system for monitoring and controlling a brushless motor, where said motor is three-phase and associable to an electric power source by means of a rectifier. The system comprises at least an actuator assembly, operatively associated to the motor and to the rectifier, which, in turn, is arranged to provide a continuous busbar voltage and a continuous reference voltage to the actuator assembly. Said actuator assembly comprises switches arranged to energize two phases of the motor simultaneously. Additionally, the system also comprises at least a voltage observer, operatively associated to the motor and to the actuator assembly, capable of permitting monitoring of an induced voltage in a non-energized phase of the motor. Additionally, the system also comprises at least a control unit operatively associated to the voltage observer. Said control unit is arranged to command the opening of a certain switch of the actuator assembly for a certain time interval to interrupt the power supply to the motor, when the measurement of the induced voltage in the non-energized phase of the motor presents a value comprised within a preset voltage interval.

In a preferred embodiment, a control unit is also arranged to identify a position of the motor and/or monitor an alteration in position of the motor based on the information coming from the voltage observer.

Preferably, the control unit is also arranged to provide said command of the actuator assembly based on the result of monitoring the voltage observer, during the start-up procedure period of the motor and during the working regime period of the motor.

One or more objectives of the invention is(are) achieved by providing a method of monitoring and controlling a brushless motor three-phase and associable to an electric power source. Said electric power source is capable of permitting the provision of a continuous busbar voltage and a continuous reference voltage to the motor. The method comprises the following steps:

i) supplying electric energy to two phases of the motor simultaneously;

ii) detecting an instant in which a change in position of the motor occurs;

iii) measuring an induced voltage in a non-energized phase of the motor;

iv) comparing the induced voltage in the non-energized phase of the motor measured in step iii with a preset voltage interval; and v) interrupting the power supply to the motor for a first preset time interval if the comparison made in step iv indicates that the induced voltage in the non-energized phase of the motor presents a value comprised within the preset voltage interval for a second preset time interval.

In other words, the present invention provides a technique of indirect sensing of internal transient currents of the motor, in order to eliminate them. More specifically, the transient currents are evaluated and identified based on the analysis of the voltage of a non-energized terminal of the motor, where a comparison of this voltage is made with a busbar voltage DC or with a reference voltage. This way, bearing in mind that the current is conducted to the positive terminal of the rectifier unit or else to the source reference, it is possible to identify the existence of internal transient currents of the motor using this indirect sensing technique. In both cases, the current runs along a freewheel diode of the inverter bridge of the motor, forcing the voltage into the coil at the voltage value of the bus or at the reference voltage. After identifying these currents, a control action is carried out in order to interrupt the supply of electric energy to the motor for a certain time.

The procedure of indirect sensing and control action is performed and repeated both during the time in which the motor is maintained in an electric position as well as for all the electric positions of the motor, so as to prevent the development of the transient currents, and, also to preserve the internal magnetic components of the motor, in addition to the power semiconductors used for driving it.

SUMMARY DESCRIPTION OF THE DRAWINGS

Figure 2:
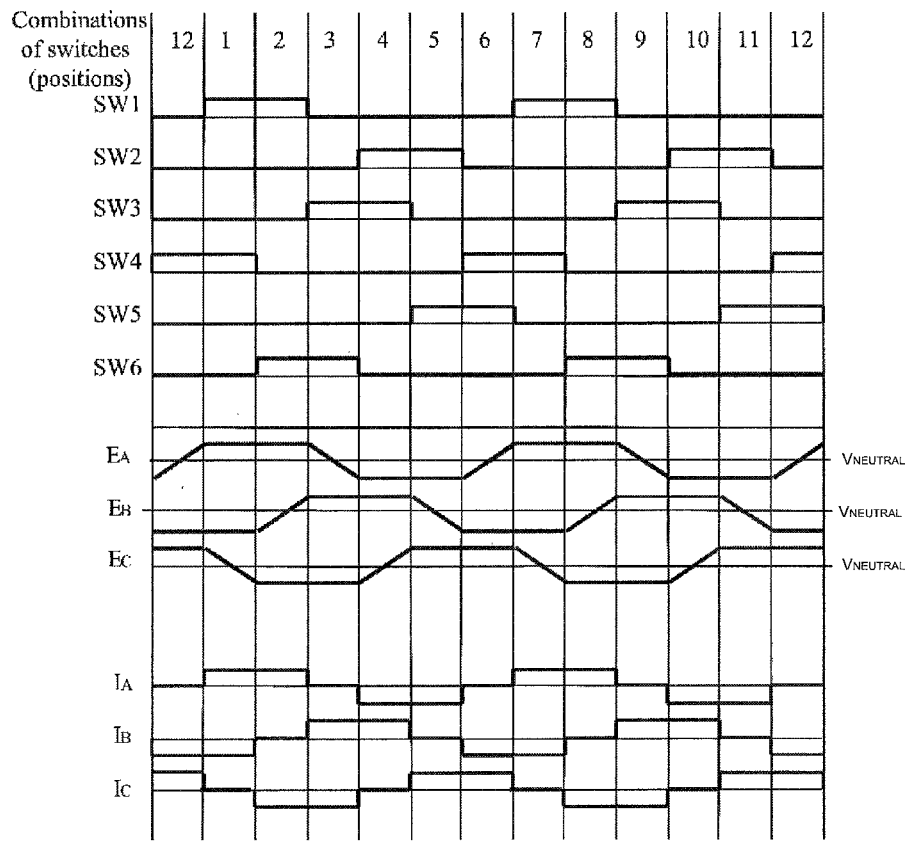
Figure 3:
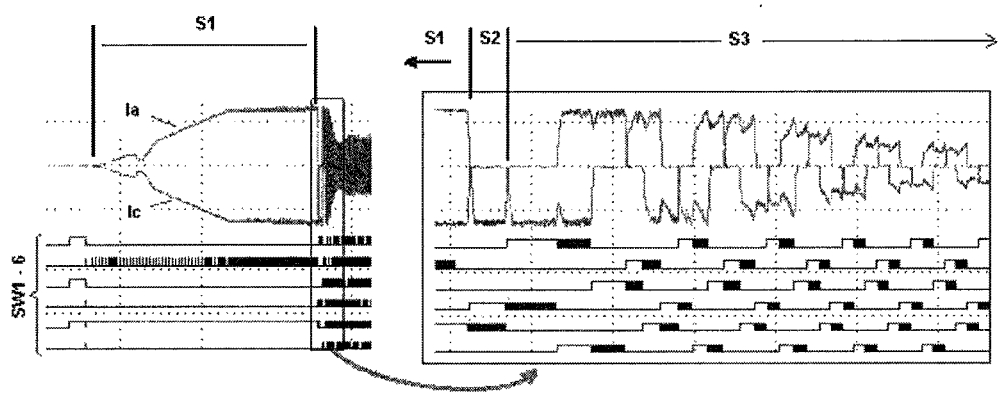
Figure 4:
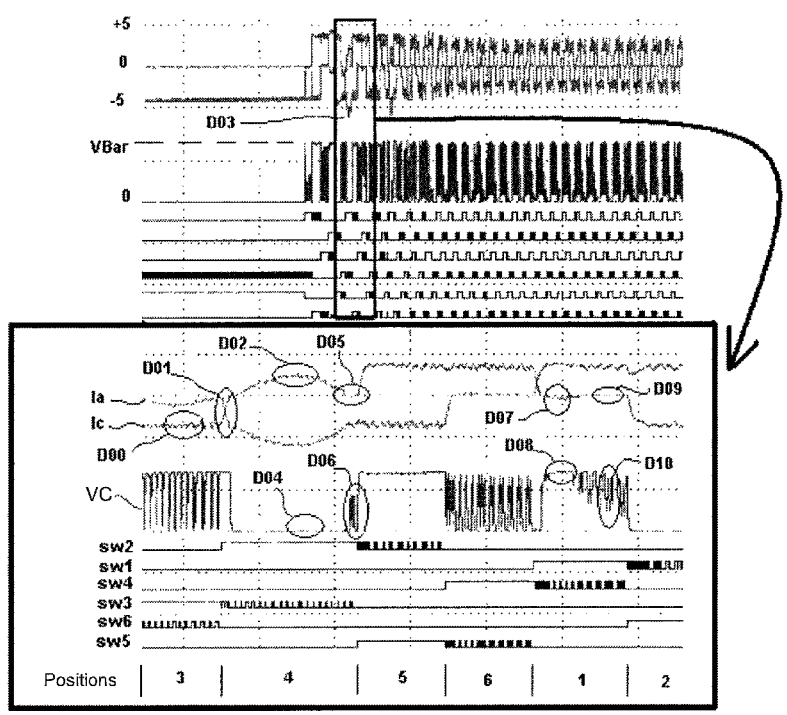
Figure 5:
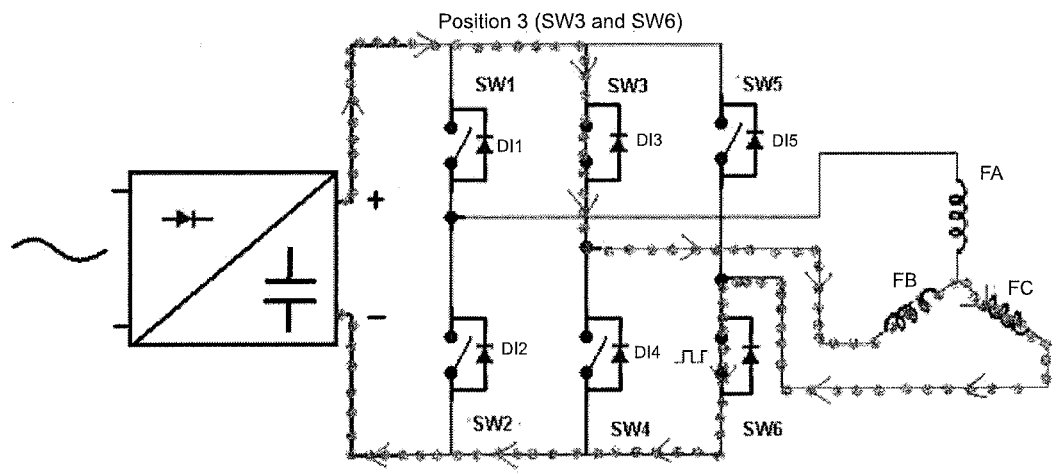
Figure 6:
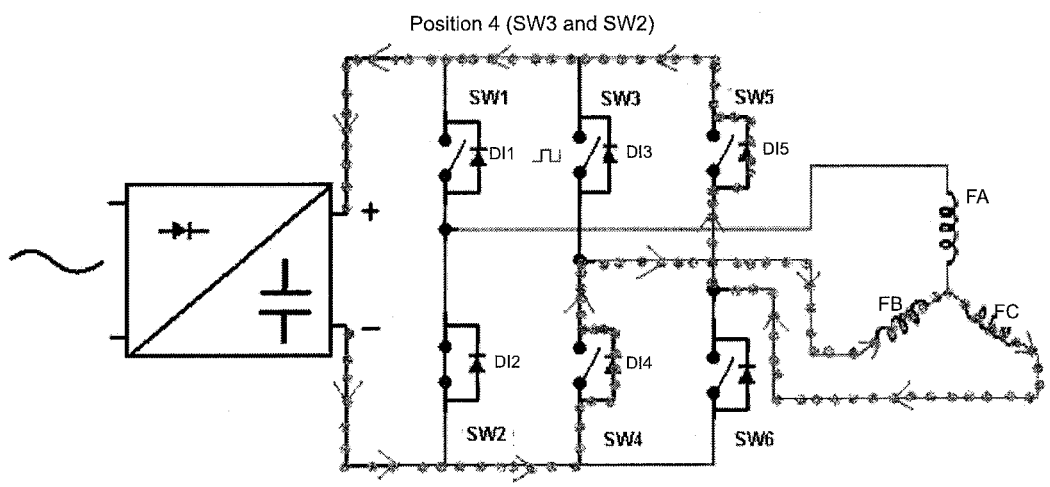
Figure 7:
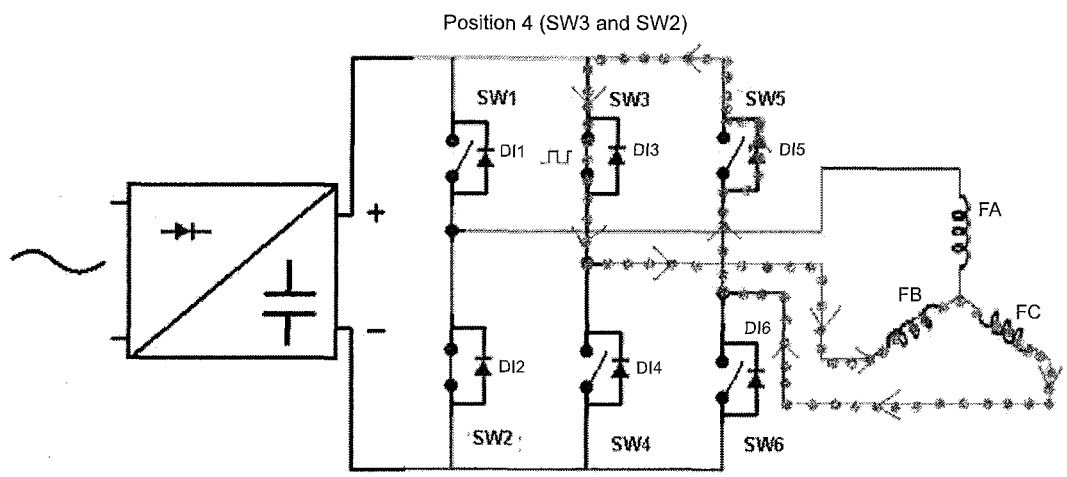
Figure 8:
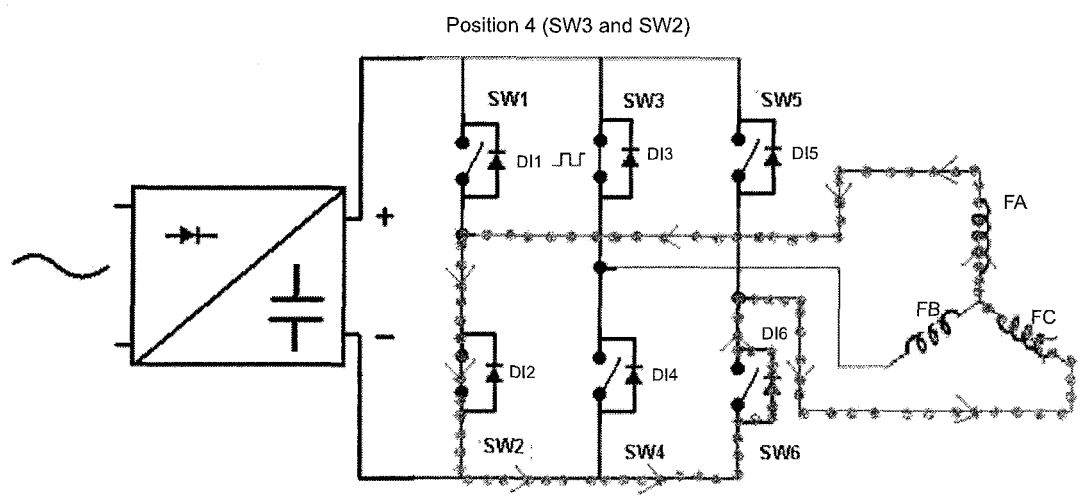
Figure 9:
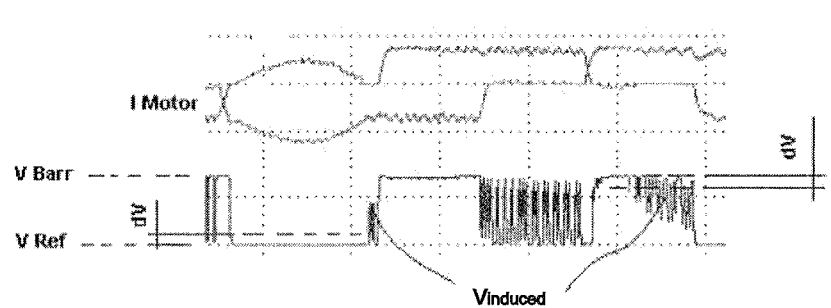
Figure 10:
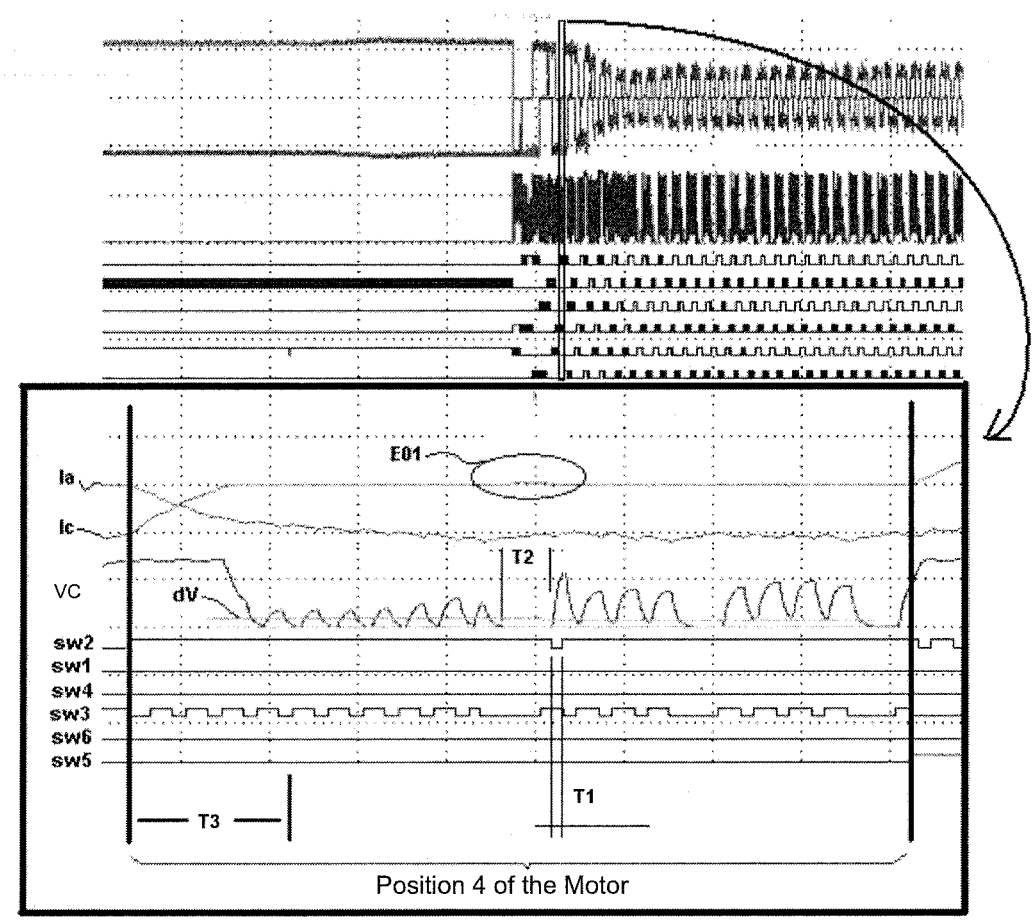
Figure 11:
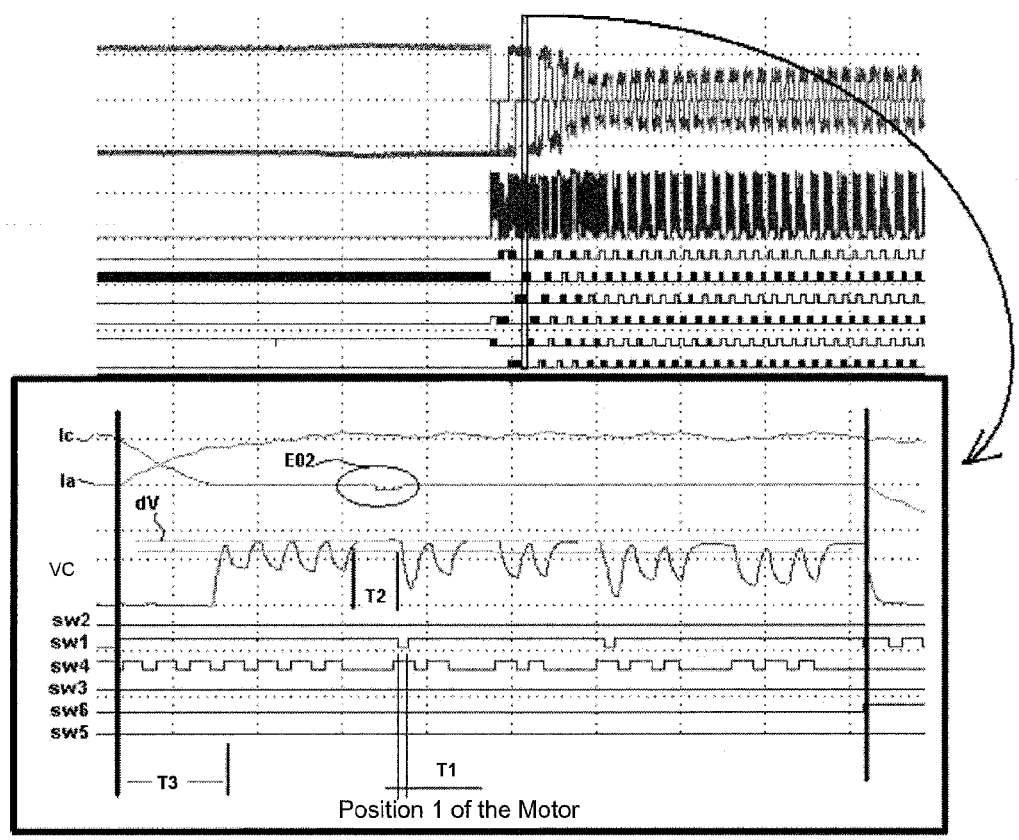
Figure 12:
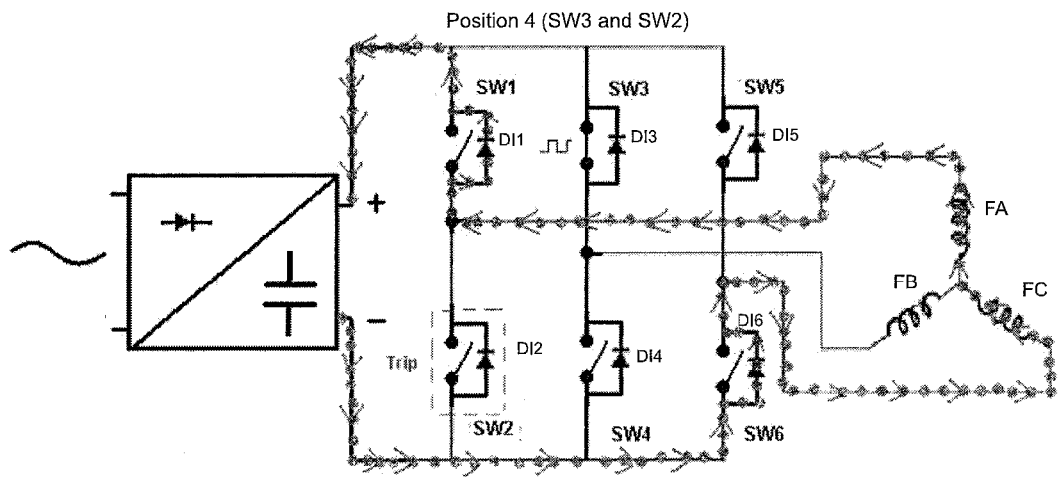
Figure 13:
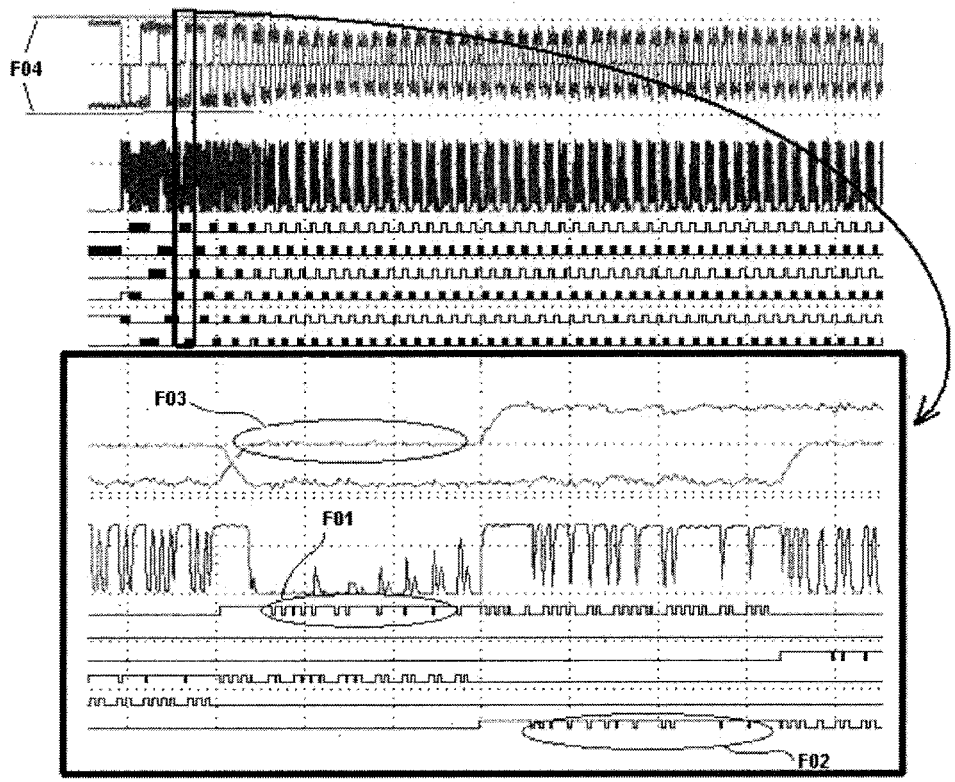

The present invention will now be described in greater detail, with references to the accompanying drawings, wherein:

FIG. 1: illustrates a block diagram of a system for monitoring and controlling a brushless motor (BLDC—Brushless DC) according to a preferred embodiment of the present invention;

FIG. 2: illustrates a graph representative of the wave forms characteristic of the BLDC motor drive of the system shown in FIG. 1;

FIG. 3: illustrates a graph representative of all the operating stages of the BLDC motor of the system shown in FIG. 1, beginning by the alignment stage of the motor (S1), open-loop drive (S2), and, finally, the auto-pilot mode (S3), where the speed control of the motor is made in closed-loop;

FIG. 4: illustrates a graph representative of an occurrence of overcurrent in the BLDC motor of the system shown in FIG. 1, in situations of high torque transients, and, additionally, of the effects deriving from the occurrence of this overcurrent at a voltage measurement point in a non-energized phase of the BLDC motor;

FIG. 5: illustrates the circulation of a current in the BLDC motor and in an actuator assembly of the system shown in FIG. 1, during a position "3" of the BLDC motor;

FIG. 6: illustrates the circulation of a demagnetization current of a phase FC of the BLDC motor of the system shown in FIG. 1, when a change in position occurs from position "3" to position "4" of the BLDC motor, considering the period of PWM off in a switch of the motor;

FIG. 7: illustrates the circulation of a demagnetization current of the phase FC of the BLDC motor of the system shown in FIG. 1, when a change in position occurs from position "3" to position "4" of the BLDC motor, considering the period of PWM on in the switch 3 of the motor;

FIG. 8: illustrates the circulation of a undesirable internal transient current in the BLDC motor of the system shown in FIG. 1, caused upon its start-up procedure, to position "4" of the BLDC motor;

FIG. 9: illustrates a graph that shows the effect of the internal transient currents of the BLDC motor of the system shown in FIG. 1 in the induced voltage in the non-energized phase of the BLDC motor;

FIG. 10: illustrates a graph that represents the steps of executing a method of monitoring and controlling a brushless motor (BLDC—Brushless DC) according to a preferred embodiment of the present invention, in position "4" of the BLDC motor in working regime;

FIG. 11: illustrates a graph that represents the steps of executing a method of monitoring and controlling a brushless motor (BLDC—Brushless DC) according to a preferred embodiment of the present invention, in position "1" of the BLDC motor in working regime;

FIG. 12: illustrates the circulation of a current in the BLDC motor and in the actuator assembly of the system illustrated in FIG. 1 upon execution of the monitoring and control method of the present invention, in position "4" of the BLDC motor; and FIG. 13: illustrates a graph that represents the steps of executing a method of monitoring and controlling a brushless motor (BLDC—Brushless DC) according to a preferred embodiment of the present invention, during a start-up procedure of the BLDC motor.

DETAILED DESCRIPTION OF THE DRAWINGS AND OF THE INVENTION

System of Monitoring and Controlling a Brushless Motor (Brushless DC—BLDC)

The system for monitoring and controlling a brushless motor 100 (Brushless DC—BLDC), the subject matter of the present invention, is schematically illustrated in FIG. 1 in the form of a block diagram.

The brushless motor 100, also called Brushless DC—BLDC motor of the three-phase type, preferably arranged in star shape. Alternatively, the triangle type arrangement could also be used. It is important to note that the present invention is also applicable to any variation of permanent magnet motors of the BLDC type.

The motor 100 is associable to an electric power source of voltage alternated by means of a rectifier. Optionally, an electric power source of voltage/continuous current could be applied to the system of the present invention, which would dispense with the use of the rectifier. A widely used example of a power source of continuous voltage consists of a DC battery.

Preferably, the system for monitoring and controlling of the present invention is applied to a motor for use in a gas compressor for household, commercial or industrial cooling equipment. Naturally, the system of the present invention can also be used in other applications besides motors for gas compressor, provided that any adaptations as may be necessary are implemented.

As can be seen in FIG. 3, the motor 100 presents three operating stages, wherein the first stage (S1) an electric current is gradually applied to two of its coils or phases, until the instant in which the alignment of the motor rotor 100 occurs in a known position. In a second stage (S2), a new arrangement of the motor 100 is driven, so as to provide movement of the motor 100. As of the stage (S3), the motor 100 already attains the sufficient speed so that there are induced voltages, and, because of this, the closed-loop operation may be initiated, providing the speed control of the motor 100. The system and method of the present invention can be applied in stages (S2) and (S3) mentioned above, so as to permit the identification and extinction of undesirable transient currents.

As can be seen in FIG. 1, the system of the present invention comprises at least an actuator assembly 200 operatively associated to the motor 100 and to the rectifier, which, in turn, is arranged to provide a continuous busbar voltage Vbar and a continuous reference voltage Vref to said actuator assembly 200. If the power source is of the continuous kind, it should be arranged to provide a continuous busbar voltage Vbar and a continuous reference voltage Vref directly to the actuator assembly 200.

Further according to FIG. 1, the actuator assembly 200 comprises a plurality of switches SW1-6 arranged to energize two phases FA,FB; FA,FC; FB,FC of the motor 100 simultaneously, in order to provide movement of the motor 100. The switches SW1-6 can consist of relays, diodes or power transistors, designed according to the need required by the application.

The actuator assembly 200 also comprises a plurality of freewheel diodes DI1-6, which each of the freewheel diodes $DI_{1-6}$ is electrically associated in parallel to each of the switches $SW_{1-6}$ of the actuator assembly 200. Said freewheel diode $DI_{1-6}$ is capable of limiting and maintaining ("securing") the voltage in the non-energized phase FC; FB; FA of the motor 100 in the value of the busbar voltage Vbar or in the value of the reference voltage Vref (depending on the position of the motor 100) upon the occurrence in a transient current in the motor 100.

Preferably, the actuator assembly 200 comprises six switches $SW_{1-6}$ grouped in three groups of pairs, and the pairs of switches $SW_{1-6}$ are associated together in parallel, as can be seen in FIG. 1. In this case, the actuator assembly 200 also comprises six freewheel diodes $DI_{1-6}$.

Additionally, the system of the present invention also comprises at least a voltage observer 300 (voltage sensor or voltage measurer), operatively associated to the motor 100 and to the actuator assembly 200, capable of permitting the monitoring of an induced voltage in a non-energized phase FC; FB; FA of the motor 100.

The measurements made by the voltage observer 300 also permit the detection of a drop in voltage in at least one freewheel diode $DI_{1-6}$ operatively associated to the non-energized phase FC; FB; FA of the motor 100. Naturally, obtaining the value of this drop in voltage is commanded by the control unit 400, so that it can subsequently be processed.

According to FIG. 1, the voltage observer 300 comprises three independent measuring buses, where each measuring line is electrically associated to a phase of the motor 100. In other words, the voltage observer 300 is capable of permitting the monitoring of each phase of the motor 100 independently.

Additionally, the system of the present invention also comprises at least a control unit 400, operatively associated to the voltage observer 300, which consists of a microcontroller, microprocessor or even an equivalent electronic circuit provided with discrete components, integrated circuits, or other analogical or digital electronic components that perform the same function as a microcontroller or microprocessor.

It is worth while noting that the system of the present invention uses as base for controlling the position of the motor 100, the technique described by patent document US 2004/0263109. In general terms, the control unit 400 is arranged to analyze the measurements of the voltage observer and drive the switches SW1, SW2, SW3, . . . , SW6 of the actuator assembly 200 in the sequence indicated in FIG. 2, pursuant to the position detected of the motor 100. In particular, FIG. 2 illustrates as ideal wave forms existing in the drive of a permanent magnet motor of the Brushless DC three-phase type, with trapezoidal wave.

The control unit 400 is arranged to command the opening of a certain switch $SW_{1-6}$ of the actuator assembly 200 for a certain time interval to interrupt the power supply to the motor 100, when the measurement of the induced voltage in the non-energized phase FC; FB; FA of the motor presents a value comprised within a preset voltage interval dV, which indicates the occurrence of a transient current in at least one phase of the motor 100.

Additionally, the control unit 400 is also arranged to identify a position of the motor 100 and/or monitor a change in position of the motor 100 based on the information coming from the voltage observer 300.

Accordingly, based on the identification of the position of the motor 100 and/or based on the detection of an alteration in position of the motor 100, it can be determined which switch $SW_{1-6}$ of the actuator assembly 200 should be opened in order to interrupt the power supply to the motor 100.

The preset voltage interval dV consists of a range of voltage values that comprises an upper voltage limit and a lower voltage limit. Said limits are preferably determined based on the position of the motor 100 (for a certain energization arrangement of the motor 100), wherein the difference between the upper voltage limit and the lower voltage limit consists in the value relating to the drop in voltage on a freewheel diode $DI_{1-6}$. Naturally, the preset voltage interval dV can be determined by the limit values obtained experimentally.

Preferably, the voltage interval dV is comprised between the upper voltage limit Vbar and the lower voltage limit Vref.

Therefore, the control unit 400 is arranged to decide whether the comparison of the voltage in the non-energized phase FC; FB; FA of the motor 100 should be made with the preset voltage interval dV that comprises a voltage of the bus Vbar or with the preset voltage interval dV that comprises the reference voltage Vref, in which said decision is based on the position of the motor 100, for a certain energization arrangement of the motor 100.

In other words, the module of the preset voltage interval dV is substantially constant and determined by the drop in voltage on a freewheel diode $DI_{1-6}$, however, the numeric voltage values of the limits (lower and upper) of this interval dV vary in accordance with the position of the motor 100. For example, in FIG. 10, it is noted that the preset voltage interval dV comprises a reference voltage Vref, for position 4 of the motor 100, when the coil of the phase FC is not energized. In FIG. 11, it is noted that the preset voltage interval dV comprises a busbar voltage Vbar, for position 1 of the motor 100, when the coil of the phase FC is not energized. Therefore, it can be affirmed that the preset voltage interval dV is "displaced" in accordance with the movement of the motor 100.

Preferably, to determine the preset voltage interval dV, it is important to consider a safety margin that consists of a preset offset value. This offset value can be calculated, for example, based on the existing noise in the electricity network, and in the tolerance percentage of the components.

Further, the control unit 400 is arranged to monitor the voltage observer 300 both during a time in which the motor 100 is maintained in a position for a certain period and also during a transition time between two positions of the motor 100. Accordingly, the opening of said switch $SW_{1-6}$ of the actuator assembly 200, capable of interrupting the power supply to the motor 100, can be commanded in these two distinct moments.

Therefore, the system of the present invention can be applied to prevent the formation of internal transient currents to the motor 100 both during its start-up procedure period, and also during its working regime period. To clarify this, when the motor 100 is used, for example, in a gas compressor, the following is considered:

A) Start-up: when the gas compressor is driven, the rotation of the motor 100 gradually increases until it attains a working rotation.

B) Working regime: when the gas compressor operates in a substantially stable condition (permanent regime).

C) Stoppage: when the electric gas compressor is switched off, the rotation of the motor 100 gradually decreases until it reaches zero.

The control unit 400 permits the identification of the instant in which the motor 100 begins the start-up procedure and the instant in which the motor 100 attains working regime based on the induced voltage of non-energized phase FC; FB; FA of the motor 100 measured by the voltage observer 300.

Simultaneously to the opening of switch $SW_{1-6}$ of the actuator assembly 200, capable of interrupting the power supply to the motor 100, the control unit 400 controls the behavior of opening of and closing of a second switch $SW_{1-6}$ of the actuator assembly 200 by applying a modulation of the PWM type, and the determination of switch $SW_{1-6}$ which should be attributed as second switch SW1-6 is made by the control unit 400 based on the position of the motor 100.

Table 1 below includes all the possible combinations of drive of the switches $SW_{1-6}$ of the actuator assembly 200, during the operation procedure of the motor 100. This table can be stored in an internal memory of the control unit 400 or in an external memory, and is accessed depending on the result of the position sensing of the motor 100. As can be noted in the table, switch $SW_{1-6}$, wherein PWM modulation is applied, is alternated whenever a change in position of the motor 100 occurs.

TABLE 1 possible combinations of the switches SW1-6 during operation of the motor.

| Switches | Positions of the BLDC motor | | | | | |
|---|---|---|---|---|---|---|
| | 1 | 2 | 3 | 4 | 5 | 6 |
| SW1 | ON | PWM | | | | |
| SW2 | | | | ON | PWM | |
| SW3 | | | ON | PWM | | |
| SW4 | PWM | | | | | ON |
| SW5 | | | | | ON | PWM |
| SW6 | | ON | PWM | | | |

Further according to FIG. 1, the system of the present invention also comprises at least one current observer 500, operatively associated to the control unit 400, capable of permitting the monitoring of a total current of the motor 100 by the control unit 400 through, for example, a shunt-type resistance.

As measurements made by the current observer 500, jointly with the readings taken by the voltage observer 300, may be used by the control unit 400 to regulate the voltage applied to the motor 100 and to control the maximum current of the motor 100.

For a better understanding of the working of the system of the present invention described above, some practical examples of operation are set forth below.

EXAMPLES

The graphs illustrated in FIG. 4 show the application of the present invention in a BLDC motor during its start-up procedure. The detail (D00) highlights a curve of current "Ic" which circulates on the coil of the phase FC of the motor 100 during position number "3". Said current "Ic" will circulate through the coil of the phase FC of the motor 100 until a change in position of the motor 100 occurs. As of this moment of change in position, as presented in detail (D01), current "Ic" begins a demagnetization stage, since in this position of the motor 100, a coil of the phase FC is no longer energized. In position "4" of the motor 100, the current circulating through the coil of the phase FC should remain at zero after the demagnetization stage, but, as can be seen in the detail (D02), in certain cases a transient current in this coil may appear, indicating an undesirable operating condition. This current is added to the current of the motor, and, as presented in detail (D03), the result is the appearance of a current peak in the motor 100, in which the component of the current that generates this peak cannot be detected by the current sensoring method, using only a current sensor. Detail (D04) consists of values measured in the coil of the non-energized phase FC of the motor, showing that its value is pegged to the reference voltage Vref, as the freewheel diode DI6 (in parallel with the switch "SW6") is conducting a transient current in the coil of the phase FC. In detail (D05) it is noted that the transient current extinguished, and, consequently, as the freewheel diode DI6 is no longer being conducted, an induced voltage can be measured, as can be seen in the detail (D06).

The details (D07, D08, D09 and D10) of FIG. 4 show an analog situation, but for position "1" of the motor. Therefore, in (D07), the appearance of a transient current in the coil of the phase FC in noted, pegging the voltage measured in this coil in the voltage of the bus Vbar, due to the conduction of the corresponding freewheel diode, as can be seen in (D08). In (D09) it is possible to note that there is no transient current, therefore, an induced voltage can be measured in the non-energized coil of the phase FC, as illustrated in (D10).

The analysis presented above analogously applies to the other phases FA and FB of the motor 100.

FIG. 5 presents the circulation path of current "Ic" of detail (D00) of FIG. 4 in the motor 100 and in the actuator assembly 200, when the motor is in position "3". It can be noted that the current "Ic" part of the power source and is applied in the coils of phases FB and FC of the motor 100, so as to generate the torque needed to move it.

FIGS. 6 and 7 both illustrate the circulation path of current "Ic" of the detail (D01) of FIG. 4, in the instant in which a change occurs from position "3" to position "4" of the motor 100. Said current consists of the demagnetization current of the coil, generated based on its induction characteristic. FIG. 6 considers the inactive cycle of PWM (switch SW3 on). In contrast, FIG. 7 considers the active cycle of 5 PWM (switch SW3 off).

FIG. 8 illustrates the path of current "Ic" in (D02) of FIG. 4 (transient current), during position "4" of the motor 100. The drop in voltage on the freewheel diode D16 (in parallel to switch SW6) is used to identify the existence of this transient current, which under normal operating conditions, should not be circulating in the motor 100. The main problem caused by this current is that it is added to the current applied to the coil of phase FA of the motor 100, providing for the formation of an overcurrent, as can be seen in the detail (D03) of FIG. 4.

In short, FIGS. 5, 6, 7, and 8 show the behavior of the current that circulates in the actuator assembly 200 and in a phase of the motor 100, during an instant before a change in position of the motor 100, during the change of position, and, lastly, during an instant following the change in position of the motor 100. The behavior of the current for all other positions and phases of the motor 100 may be deduced analogously.

FIG. 9 demonstrates that depending on the position of the motor 100, the transient current that circulates therein through the freewheel diode secures the voltage of the non-energized coil on the busbar voltage Vbar or on the reference voltage Vref. If such transient currents do not exist, the voltage measured consists of the induced voltage on the motor 100, which may be an upward or downward trend, depending on the position of the motor 100. As already explained previously, to identify said currents, the control unit 400 uses a comparison window, where the voltage of the non-energized coil should be outside the delimited "dV" voltage window (preset voltage interval). It is important to remember that the value of the preset voltage interval dV is adjusted considering the value of the drop in voltage on the freewheel diode, plus an offset value, which guarantees a safety margin for reliable operation of the algorithm. The indication made by "induced V" in FIG. 9 shows that when there are no transient currents, the induced voltages remain outside the delimited "dV" voltage window.

Table 2 below presents all the combinations of the conditions for detecting the transient currents in the motor 100, listing the voltage measured in the non-energized phase FC; FB; FA with the position of the motor 100. Additionally, table 2 also presents switch $SW_{1-6}$ corresponding to each position of the motor 100, which should be opened to provide the extinction of the transient current. In 10 table, the indications "Va", "Vb" and Vc" relating to the voltages measured in the coils of the non-energized phases, "Vbar" consists of the voltage of the bus, and "dV" consists of the voltage window (preset voltage interval dV) used to determine the existence of the transient currents.

TABLE 2

Table listing the measurements of the voltages in the coil of the non-energized phase of the motor with the identification of internal transient currents, and, presentation of the corresponding switch that should be opened by the extinction algorithm.

|  | Positions of the BLDC motor | | | | |
|---|---|---|---|---|---|
| Freewheel condition | 2 | 3 | 4 | 5 | 6 |
| Va > (vbar - dV) | | | ■ | | |
| Vb > (vbar - dV) | ■ | | | | |
| Vc > (vbar - dV) | | | | ■ | |
| Va > dV | | | | | ■ |
| Vb > dV | | ■ | | | |
| Vc > dV | | | | ■ | |

|  | Positions of the BLDC motor | | | | |
|---|---|---|---|---|---|
|  | 1 | 2 | 3 | 4 | 5 |
| Action of the technique and extinction of transient current | SW1 | SW6 | SW3 | SW2 | SW5 | SW4 |

Accordingly, based on the identification of the transient currents, a technique for extinguishing said currents is executed by the control unit 400, acting to prevent their evolution to relatively high values.

FIG. 10 illustrates the action steps relating to this technique to position 4 of the motor 100, as now described: whenever a change in position of the motor 100 occurs, the new position is identified, and, the test condition for identifying the existence of the transient current is loaded in the control unit 400, according to table 2 above.

In sequence, the control unit 400 awaits the end of time "T3", which consists of a time needed for extinguishing the demagnetization current of the coil, specified by "Ic" in FIG. 10. This time may be defined experimentally or may be defined by monitoring the voltage in the coil of the non-energized phase of the motor 100 or may even be deactivated, since the demagnetization current condition secures the voltage in the non-energized coil in the opposite reference, which does not lead the algorithm to an incorrect operation.

Once the time "T3" has expired, the control unit 400 begins monitoring the induced voltage "Vc" in the non-energized coil. When voltage "Vc" is inside window "dV", it is considered that there is some undesirable transient current circulating in the motor 100. In contrast, if voltage "Vc" is outside window "dV", it is considered that there are no undesirable transient currents. This being the case, if voltage "Vc" is inside window "dV", a time count is begun, and, whenever voltage "Vc" leaves window "dV", a time count is reset.

If the voltage measured in the coil remains inside the window "dV" for a time equal or greater than "T2", the control unit 400 deactivates one of the switches $SW_{1-6}$, depending on the position of the motor 100, so as to interrupt momentarily the power supply to the motor 100. The interruption of the switch $SW_{1-6}$ occurs during a time indicated by "T1" in FIG. 11, in which after this time, again switch $SW_{1-6}$ is activated, and the monitoring of the induced voltage "Vc" restarts.

This process of monitoring and control occurs however many times necessary when motor 100 remains in a certain position, and also for all the positions of the motor 100.

In particular, in FIG. 10, in (E01) a small transient current arises in coil "Ic" that secures the voltage "Vc" in the reference voltage Vref of the power source, by virtue of its circulation through the freewheel diode. After detecting this event, a time count begins that attains the value of "T2". With the aim of preventing an increase in the transient current in "Ic", the control unit 400 opens switch SW2 for a period of time "T1". After this action, it can be noted that transient currents in "Ic" no longer appeared, and therefore, no actions of the control unit 400 were necessary in this position of the motor 100.

The working of this technique for the other positions of the motor 100 is analogous to that described above, and can be deduced based on the procedure described.

FIG. 11 presents a curve that illustrates the result of the application of the technique of the present invention, but for position "1" of the motor. As can be noted, the reference of window "dV" was altered for the voltage of the bus Vbar and the switch used for action of the method is "SW1", but its working is similar to all the positions of the motor 100.

FIG. 12 demonstrates the path of the transient current, presented in detail "D02" of FIG. 4, in position "4" of the motor 100, upon action of the technique and extinction of transient current of the present invention. The dotted line "Trip" indicates the opening of the switch as a result of the action of the method for extinguishing the transient current. FIG. 12 presents the path of the current in the off cycle of PWM.

In contrast, FIG. 13 presents the path of the current in the active cycle of PWM. The technique can be adjusted or adapted to permit the opening of two switches relating to a position of the motor 100 during time "T1", whereby allowing the behavior of the current always to be analog to that presented in FIG. 12.

FIG. 14 illustrates a graph showing the action of the technique and extinction of transient currents of the present invention, it being applied to the start-up of a gas compressor in a system with unequalized pressures. In (F03), there can be seen a plurality of small trends of appearance of transient currents, which are immediately detected by the extinction/protection technique. In response to these transient currents, in (F01), it is possible to note the control action of the technique to extinguish these currents, so as to prevent their evolution. In the same way, in (F02), in the following position of the motor 100, the technique is acting to prevent the evolution of the transient currents. Therefore, the action of the technique guarantees that the current of the motor 100 always remains within a maximum limit, as can be noted in (F04).

Method for Monitoring and Controlling a Brushless Motor Brushless DC—BLDC)

Based on the description of the system and the examples shown above, it is possible to define the steps of the method of monitoring and controlling a brushless motor 100, which is also the subject matter of the present invention:

i) supplying electric energy to two phases FA,FB; FA,FC; FB,FC of the motor 100 simultaneously;

ii) detecting an instant in which a change in position of the motor 100 occurs. This step comprises a substep to identify the position of the motor 100;

iii) measuring an induced voltage in a non-energized phase FC; FB; FA of the motor 100;

iv) comparing the induced voltage in the non-energized phase FC; FB; FA of the motor 100 measured in step iii with a preset voltage interval dV;

v) interrupting the power supply to the motor 100 for a first preset time interval T1 if the comparison made in step iv indicates that the induced voltage in the non-energized phase FC; FB; FA of the motor 100 presents a value comprised within the preset voltage interval dV during a second preset time interval T2. This step consists of a step of opening a switch $SW_{1-6}$ of the actuator assembly 200 operatively associated to the motor 100. This step comprises a substep of conduction of electric current on a freewheel diode, $DI_{1-6}$ comprised by the actuator assembly 200, electrically associated in parallel to a switch $SW_{1-6}$.

Naturally, steps i to v are repeated through cycles of iterations of the method up to the instant of start-up of the motor 100.

Preferably, the method of the present invention comprises a demagnetization step of the previously energized phase FC; FB; FA of the motor 100, limiting the value in the coil to the value of the busbar voltage Vbar or in the value of the reference voltage Vref, wherein said limiting step is executed prior to executing step iii and after executing step ii.

Step iv comprises a substep of defining an upper voltage limit and a lower voltage limit of the preset voltage interval dV. Said upper and lower voltage limits are defined based on the position identified of the motor 100 (considering a certain energization arrangement of the motor 100) where the difference between the upper voltage limit and the lower voltage limit of the preset voltage interval dV consists of a range of values corresponding to a drop in voltage on a freewheel diode $DI_{1-6}$.

Preferably, the busbar voltage Vbar or the reference voltage Vref is comprised between the upper voltage limit and the lower voltage limit of the preset voltage interval dV. In this case, the method of the present invention also comprises the step of deciding whether the comparison of the induced voltage in the non-energized phase FC; FB; FA of the motor 100 should be made with the preset voltage interval dV that comprises the voltage of the bus Vbar or with the preset voltage interval dV that comprises the reference voltage Vref, wherein said decision is based on the position of the motor 100, considering a certain energization arrangement of the motor 100, as explained previously. Said decision step is executed prior to executing step iv and after executing step iii.

The step of defining the upper voltage limit and the lower voltage limit of the preset voltage interval dV considers a safety margin, which, in turn, consists of a preset offset value.

Further, the method of the present invention comprises the step of waiting for a third preset time interval T3 executed prior to executing step iii. The third time interval T3 can be determined experimentally or defined by the induced voltage in a non-energized phase of the motor 100 to be measured in step iii in a future iteration cycle of the method.

Additionally, the method of the present invention also comprises the time count step, when the comparison made in step iv indicates that the induced voltage in the non-energized phase FC; FB; FA of the motor 100 presents a value comprised within the preset voltage interval dV. When the time count attains a time equivalent to the second preset time interval T2, the finalization step of the time count occurs.

Moreover, the method of the present invention comprises a time (count) resetting step, when the comparison made in step iv indicates that the induced voltage in the non-energized phase FC; FB; FA of the motor 100 presents a value not comprised within the preset voltage interval dV.

All the steps described above of the method of the present invention occur during the start-up procedure or during the working regime of the motor 100.

Accordingly, the present invention is capable of preventing the appearance, formation and evolution of internal transient currents in the motor that may demagnetize the magnets of the motor or even damage the power semiconductors that drive the BLDC motor, permitting its application in situations where it is necessary to start up the compressors under unequalized suction and discharge pressure conditions, such as, for example, applications using block values or expansion valves.

Additionally, the present invention also permits the use of power semiconductors of lower current capacity in the electronic drive device, whereby reducing costs.

Having described an example of a preferred embodiment, it should be understood that the scope of the present invention encompasses other possible variations, being limited only by the content of the accompanying claims, possible equivalents being included therein.

The invention claimed is:

1. System for monitoring and controlling a brushless motor (100), the motor (100) being three-phase and associable to an electric power source by means of a rectifier, the system comprising:

an actuator assembly (200) operatively associated to the motor (100) and to the rectifier, the rectifier being arranged to provide a busbar voltage (Vbar) and a reference voltage (Vref) to the actuator assembly (200), the busbar voltage (Vbar) and the reference voltage (Vref) being continuous, the actuator assembly (200) comprising switches ($SW_{1-6}$) arranged to energize two phases (FA,FB; FA,FC; FB,FC) of the motor (100) simultaneously;

a voltage observer (300) operatively associated to the motor (100) and to the actuator assembly (200), the voltage observer (300) being capable of permitting the monitoring of an induced voltage in a non-energized phase (FC; FB; FA) of the motor (100); and a control unit (400) operatively associated to the voltage observer (300), the control unit (400) being arranged to command the opening of a certain switch ($SW_{1-6}$) of the actuator assembly (200) for a certain time interval to interrupt the power supply to the motor (100), when the reading of the induced voltage in the non-energized phase (FC; FB; FA) of the motor (100) presents a value comprised within a preset voltage interval (dV).

2. System according to claim 1, wherein the control unit (400) is arranged to identify a position of the motor (100) and/or monitor an alteration in position of the motor (100) based on information coming from the voltage observer (300), the control unit (400) being arranged to determine which switch ($SW_{1-6}$) of the actuator assembly (200) should be opened to interrupt the power supply to the motor (100) based on the identification of the position of the motor (100) and/or based on the detection of an alteration in position of the motor (100).

3. System according to claim 2, wherein the control unit (400) is arranged to monitor the voltage observer (300) to command a opening of the switch ($SW_{1-6}$), capable of interrupting the power supply to the motor (100), for a time in which the motor (100) remains in a position for a certain period and during a transition time between two positions of the motor (100).

4. System according to claim 3, wherein the control unit (400) is arranged, simultaneously to the opening of the switch ($SW_{1-6}$), capable of interrupting the power supply to the motor (100), to control the behavior of opening and of closing a second switch ($SW_{1-6}$) of the actuator assembly (200) by applying the modulation of the PWM type, the control unit (400) also being arranged to determine which switch ($SW_{1-6}$) of the actuator assembly (200) should be attributed as second switch ($SW_{1-6}$) based on the position of the motor (100).

5. System according to claim 4, wherein the actuator assembly (200) comprises freewheel diodes ($DI_{1-6}$), where each of the freewheel diodes ($DI_{1-6}$) is electrically associated in parallel to each of the switches ($SW_{1-6}$) of the actuator assembly (200), the freewheel diode ($DI_{1-6}$) being capable of maintaining the induced voltage in the non-energized phase (FC; FB; FA) of the motor (100) in the busbar voltage (Vbar) or in the reference voltage (Vref) when a transient current occurs in the motor (100).

6. System according to claim 5, wherein the control unit (400) is arranged to permit detection of the drop in voltage in at least one freewheel diode ($DI_{1-6}$), operatively associated to the non-energized phase (FC; FB; FA) of the motor (100), by the voltage observer (300).

7. System according to claim 6, wherein the preset voltage interval (dV) consists of a range of voltage values that comprises an upper voltage limit and a lower voltage limit, said upper and lower voltage limits being determined based on the position of the motor (100), the difference between the upper voltage limit and the lower voltage limit consisting of the value relating to the drop in voltage on a freewheel diode ($DI_{1-6}$).

8. System according to claim 7, wherein the preset voltage interval (dV) comprises a value relating to the busbar voltage (Vbar) or to the reference voltage (Vref).

9. System according to claim 8, wherein the control unit (400) is arranged to decide whether the comparison of the voltage in the non-energized phase (FC; FB; FA) of the motor (100) should be made with the preset voltage interval (dV) that comprises the voltage of the bus (Vbar) or with the preset voltage interval (dV) that comprises the reference voltage (Vref), the decision being based on the position of the motor (100).

10. System according to claim 1, further comprising at least a current observer (500) operatively associated to the control unit (400), the current observer (500) being capable of permitting the monitoring of a total current of the motor (100) by the control unit (400), the control unit (400) being arranged to regulate the voltage applied to the motor (100) and to control the maximum current of the motor (100) based on the measurements made by the voltage observer (300) and by the current observer (500).

11. System according to claim 1, wherein the control unit (400) is arranged to provide the command of opening of the switch ($SW_{1-6}$) capable of interrupting the power supply to the motor (100), based on the result of monitoring the voltage observer (300) during a start-up procedure period of the motor (100) and during a working regime period of the motor (100).

12. System for monitoring and controlling a brushless motor (100), the motor (100) being associable to an electric power source capable of providing a continuous current, the system comprising:

an actuator assembly (200) operatively associated to the motor (100) and to the rectifier, a power source being arranged to provide a busbar voltage (Vbar) and a reference voltage (Vref) to the actuator assembly (200), the busbar voltage (Vbar) and the reference voltage being continuous (Vref), the actuator assembly (200) being arranged to energize two phases (FA,FB; FA,FC; FB,FC) of the motor (100) simultaneously;

a voltage observer (300) operatively associated to the motor (100) and to the actuator assembly (200), the voltage observer (300) being capable of permitting the monitoring of an induced voltage in a non-energized phase (FC; FB; FA) of the motor (100); and a control unit (400) operatively associated to the voltage observer (300), the control unit (400) being arranged to identify a position of the motor (100) and/or monitor an alteration in position of the motor (100) based on information coming from the voltage observer (300), the control unit (400) being arranged, based on the identification of the position of the motor (100) and/or based on the detection of alteration in position of the motor (100), to command the actuator assembly (200) for a certain time interval to interrupt the power supply to the motor (100), when the measurement of the induced voltage in the non-energized phase (FC; FB; FA) of the motor (100) presents a value comprised within a preset voltage interval (dV), the control unit (400) also being arranged to provide said command of the actuator assembly (200) based on the result of monitoring the voltage observer (300) during a start-up procedure period of the motor (100) and during a working regime period of the motor (100).

13. System according to claim 12, wherein the actuator assembly comprises:

six switches ($SW_{1-6}$) grouped into three pair groups, wherein the pairs of switches ($SW_{1-6}$) are associated together in parallel; and six freewheel diodes ($DI_{1-6}$), each freewheel diode ($DI_{1-6}$) being electrically associated in parallel with each switch ($SW_{1-6}$), the freewheel diode ($DI_{1-6}$) being capable of maintaining the induced voltage in the non-energized phase (FC; FB; FA) of the motor (100) in the busbar voltage (Vbar) or in the reference voltage (Vref) when a transient current occurs in the motor (100), a control unit (400) being arranged to permit detection of the drop in voltage in at least one freewheel diode ($DI_{1-6}$), operatively associated to the non-energized phase (FC; FB; FA) of the motor, (100) by the voltage observer (300), the control unit (400) also being arranged to command the opening of a certain switch ($SW_{1-6}$) of the actuator assembly (200) for a certain time interval to interrupt the power supply to the motor (100), when the measurement of the induced voltage in the non-energized phase (FC; FB; FA) of the motor presents a value comprised within the preset voltage interval (dV).

14. Method for monitoring and controlling a brushless motor (100), the motor (100) being three-phase and associable to an electric power source, the electric power source being capable of permitting the supply of a busbar voltage (Vbar) and a reference voltage (Vref) to the motor (100), the busbar voltage (Vbar) and the reference voltage (Vref) being continuous, the method comprising the following steps:

i) supplying electric energy to two phases (FA,FB; FA,FC; FB,FC) of the motor (100) simultaneously;

ii) detecting an instant in which a change in position of the motor (100) occurs;

iii) measuring an induced voltage in a non-energized phase (FC; FB; FA) of the motor (100);

iv) comparing the induced voltage in the non-energized phase (FC; 5 FB; FA) of the motor (100) measured in step iii with a preset voltage interval (dV); and v) interrupting the power supply to the motor (100) for a first preset time interval (T1) if the comparison made in step iv indicates that the induced voltage in the non-energized phase (FC; FB; FA) of the motor (100) presents a value comprised within the preset voltage interval (dV) during a second preset time interval (T2).

15. Method according to claim 14, further comprising a limiting step of the induced voltage in the non-energized phase (FC; FB; FA) of the motor (100) in the value of the busbar voltage (Vbar) or in the value of the reference voltage (Vref), said limiting step being executed prior to executing step iii and after executing step ii.

16. Method according to claim 14, wherein step ii comprises a substep of identifying the position of the motor (100).

17. Method according to claim 16, wherein step iv comprises a substep of defining an upper voltage limit and a lower voltage limit of the preset voltage interval (dV), the upper and lower voltage limits being defined based on the identified position of the motor (100).

18. Method according to claim 17, further comprising a waiting step for a third preset time interval (T3), said waiting step being executed prior to executing step iii.

19. Method according to claim 18, further comprising a time count step, when the comparison made in step iv indicates that the induced voltage in the non-energized phase (FC; FB; FA) of the motor (100) presents a value comprised within the preset voltage interval (dV).

20. Method according to claim 19, further comprising a time resetting step, when the comparison made in step iv indicates that the induced voltage in the non-energized phase (FC; FB; FA) of the motor (100) presents a value not comprised within the preset voltage interval (dV).

21. Method according to claim 20, further comprising a time count finalization step, when the time count attains a time equivalent to the second preset time interval (T2).

22. Method according to claim 21, wherein the step v) interrupting the power supply consists of a step of opening a switch ($SW_{1-6}$) comprised by an actuator assembly (200) operatively associated to the motor (100).

23. Method according to claim 22, wherein the step v) interrupting the power supply comprises a substep of conduction of electric current on a freewheel diode ($DI_{1-6}$) comprised by the actuator assembly (200), the freewheel diode ($DI_{1-6}$) being electrically associated in parallel to a switch ($SW_{1-6}$).

24. Method according to claim 23, wherein the difference between the upper voltage limit and the lower voltage limit of the preset voltage interval (dV) consists of a value corresponding to a drop in voltage on a freewheel diode ($DI_{1-6}$).

25. Method according to claim 24, wherein the preset voltage interval (dV) comprises the voltage of the bus (Vbar) or a reference voltage (Vref).

26. Method according to claim 25, wherein the steps i to v occur during a start-up procedure or during a working regime of the motor (100).

27. Method according to claim 26, wherein the steps i to v are repeated through iteration cycles until the stoppage instant of the motor (100).

* * * * *